United States Patent
Araki et al.

(10) Patent No.: US 8,335,633 B2
(45) Date of Patent: Dec. 18, 2012

(54) DRIVING CONTROL SYSTEM FOR PERSONAL WATERCRAFT

(75) Inventors: Toshio Araki, Kakogawa (JP); Atsufumi Ozaki, Kobe (JP); Satoru Watabe, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 852 days.

(21) Appl. No.: 12/238,957

(22) Filed: Sep. 26, 2008

(65) Prior Publication Data

US 2010/0082214 A1 Apr. 1, 2010

(51) Int. Cl.
*G06F 19/00* (2006.01)
*G06G 7/70* (2006.01)

(52) U.S. Cl. ........ 701/110; 701/102; 701/115; 180/179; 123/320; 123/321; 123/322

(58) Field of Classification Search .................. 701/110, 701/102, 115, 93, 97, 21; 123/395, 357, 123/436, 320, 321, 322, 323; 180/170, 179, 180/169; 440/1, 87
See application file for complete search history.

(56) References Cited

U.S. PATENT DOCUMENTS

| | | | | |
|---|---|---|---|---|
| 5,483,927 A * | 1/1996 | Letang et al. | | 123/41.12 |
| 6,067,489 A * | 5/2000 | Letang et al. | | 701/36 |
| 6,076,622 A * | 6/2000 | Chakraborty et al. | | 180/169 |
| 6,330,873 B1 * | 12/2001 | Letang et al. | | 123/322 |
| 6,776,676 B2 | 8/2004 | Tanaka et al. | | |
| 6,814,053 B2 * | 11/2004 | Hawkins et al. | | 123/351 |
| 2004/0084014 A1 * | 5/2004 | Hawkins et al. | | 123/395 |
| 2005/0015196 A1 * | 1/2005 | Hawkins | | 701/110 |
| 2010/0240266 A1 * | 9/2010 | Shibayama et al. | | 440/1 |

* cited by examiner

*Primary Examiner* — Ronnie Mancho
(74) *Attorney, Agent, or Firm* — Alleman Hall McCoy Russell & Tuttle LLP

(57) ABSTRACT

A driving control system includes a controller which is configured to, in response to a command for starting an autocruise mode generated by the operation of an input device, control an engine speed or a vehicle speed so that a value detected by a speed detector falls within a cruising speed range, when the value detected by the speed detector is outside the cruising speed range; and to then cause the watercraft to cruise at a constant engine speed or at a constant vehicle speed.

12 Claims, 6 Drawing Sheets

DRIVING CONTROL SYSTEM FOR PERSONAL WATERCRAFT

TECHNICAL FIELD

The present invention relates to a driving control system for a personal watercraft (PWC) capable of driving in an auto-cruise mode.

BACKGROUND ART

Conventionally, for personal watercraft, an auto-cruise (automated cruise) mode has been disclosed, in which a motor controls a throttle valve for changing an amount of intake-air supplied to an engine under control of an ECU (electronic control unit) and the personal watercraft is driving at a constant speed automatically without depending on a rider's operation for opening and closing the throttle valve. In the auto-cruise mode, the operation performed by the rider can be reduced as compared to a normal mode in which the rider manually performs the operation for opening and closing the throttle valve.

When a body of the watercraft is skipping over water waves, a water intake provided on a bottom surface of a hull of the watercraft is exposed in air for a moment, decreasing a load applied on the engine. This may sometimes cause over revolution of the engine. Under this condition, if the auto-cruise mode is turned on, then the over revolution of the engine is maintained. To avoid this, a personal watercraft is configured to be inhibited from starting the auto-cruise mode irrespective of the rider's operation for turning on the auto-cruise mode, if the engine speed is higher than a preset upper limit value (see Japanese Laid-Open Patent Application Publication No. 2007-314084).

However, the rider may feel driving discomfort, because the auto-cruise mode is not started even though the rider has turned on the auto-cruise mode. For example, in a case where the rider turns on the auto-cruise mode while the watercraft is driving steadily, the auto-cruise mode is inhibited from being started if the body of the watercraft is above the water surface and the engine speed becomes higher than the preset upper limit value for a moment. This may force the rider to turn on the auto-cruise mode again.

SUMMARY OF THE INVENTION

According to a first aspect of the present invention, there is provided a driving control system for a personal watercraft comprising a speed detector configured to detect a value of an engine speed of an engine mounted in the personal watercraft or a vehicle speed of the watercraft; a controller configured to be able to execute an auto-cruise mode in which the watercraft is cruising at a constant engine speed or at a constant vehicle speed; a memory configured to store a cruising speed range of the engine speed or the vehicle speed in which the watercraft is permitted to cruise in the auto-cruise mode; and an input device which is operated by a rider to cause the controller to generate a command for starting the auto-cruise mode; wherein the controller is configured to, in response to the command for starting the auto-cruise mode generated by the operation of the input device, control the engine speed or the vehicle speed so that the value detected by the speed detector falls within the cruising speed range, when the value detected by the speed detector is outside the cruising speed range; and to then cause the watercraft to cruise at the constant engine speed or at the constant vehicle speed.

In accordance with the above configuration, when the command for starting the auto-cruise mode has been generated, the auto-cruise mode is not inhibited and is started after the engine speed or the vehicle speed is controlled to fall within the cruising speed range, even if the engine speed or the vehicle speed is outside the cruising speed range. This makes it possible to avoid for the rider to avoid feeling driving discomfort.

According to a second aspect of the present invention, there is provided a driving control system for a personal watercraft comprising a speed detector configured to detect an engine speed of an engine mounted in the personal watercraft or a vehicle speed of the watercraft; a controller configured to be able to execute an auto-cruise mode in which the watercraft is cruising at a constant engine speed or at a constant vehicle speed; a memory configured to store a cruising speed range of the engine speed or the vehicle speed in which the watercraft is permitted to cruise in the auto-cruise mode; and an input device which is operated by a rider to cause the controller to start a command for starting the auto-cruise mode; wherein the controller is configured to, in response to the command for starting the auto-cruise mode generated by the operation of the input device, defer starting the auto-cruise mode, when the value detected by the speed detector is outside the cruising speed range; and to then cause the watercraft to cruise at the constant engine speed or at the constant vehicle speed after the value detected by the speed detector falls within the cruising speed range.

In accordance with the above described configuration, when the command for starting the auto-cruise mode has been generated, the auto-cruise mode is not inhibited and is started, after the controller defers starting the auto-cruise mode until the engine speed or vehicle speed falls within the cruising speed range, even if the engine speed is outside the cruising speed range. This makes it possible to avoid for the rider to avoid feeling driving discomfort.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the accompanying drawings. Hereinbelow, the directions are referenced from a rider riding in a personal watercraft except for cases specifically illustrated.

(Embodiment 1)

Figure 1:
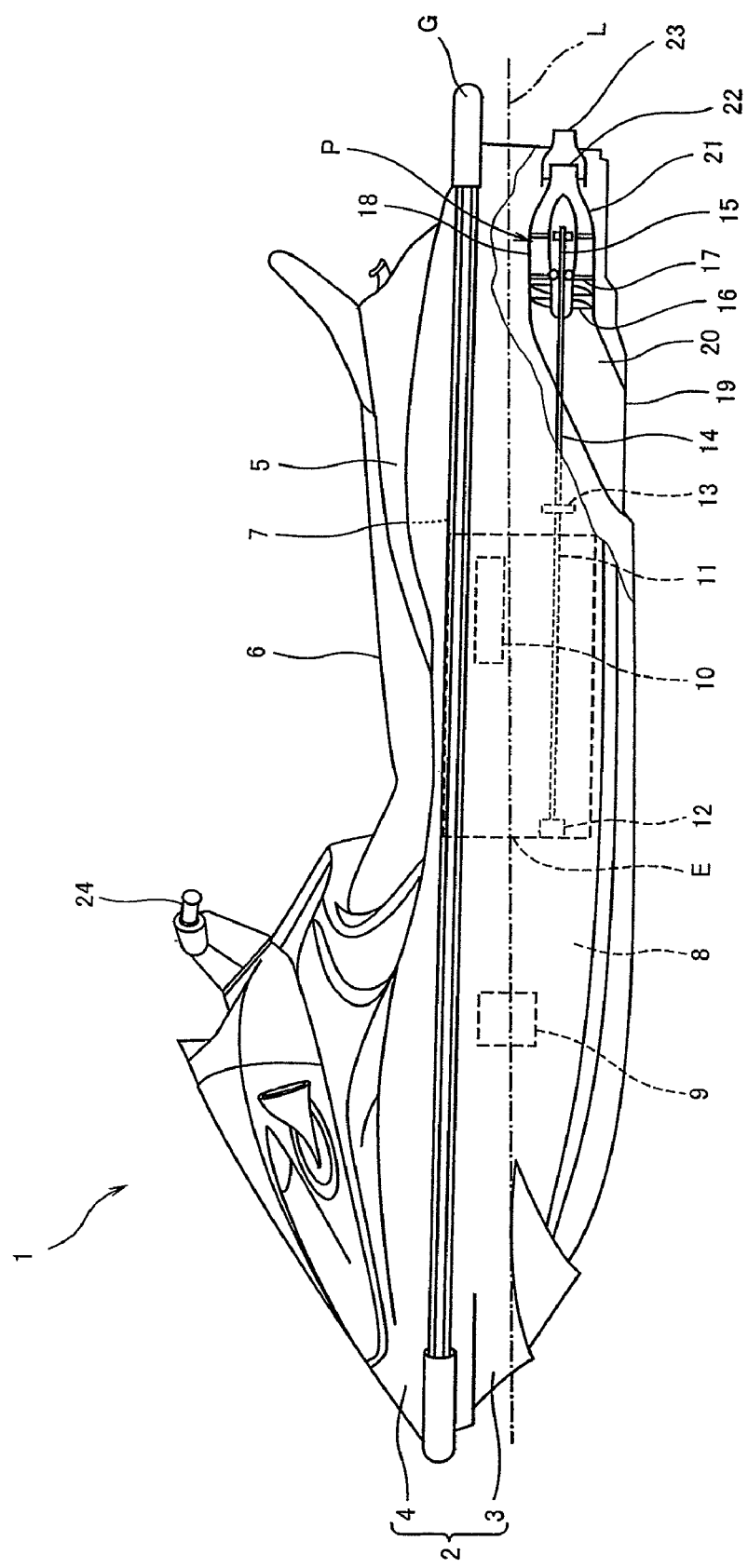
FIG. 1 is a left side view of a personal watercraft according to a first embodiment of the present invention, a part of which is cut away.

FIG. 1 is a left side view of a personal watercraft 1 according to the first embodiment of the present invention, a part of which is cut away. Turning now to FIG. 1, the personal watercraft 1 is a straddle-type personal watercraft which is provided with a seat 6 straddled by the rider. A body 2 of the watercraft 1 includes a hull 3 and a deck 4 covering the hull 3 from above. A line connecting the hull 3 and the deck 4 each other over the entire periphery is called a gunnel line G. The gunnel line G is located above a waterline L of the watercraft 1. A center region in a width direction of a rear portion of the deck 4 protrudes upward to form a protruding portion 5. The seat 6 is mounted over an upper surface of the protruding portion 5. A deck floor 7 is formed on opposite (right and left) sides in the width direction of the protruding portion 5 to enable the rider to put the rider's feet thereon.

An engine E and an ECU (electronic control unit) 9 are built into an inner space 8 defined by the hull 3 and the deck 4 below the seat 6. The ECU 9 is configured to control the engine E. An electronic control throttle system 10 is coupled to intake ports (not shown) of the engine E. The engine E, the ECU 9, and the throttle system 10 are communicatively coupled to each other via electric wires. A crankshaft 11 of the engine E extends in the longitudinal direction of the body 2. An engine speed sensor 12 is attached on the crankshaft 11. The engine speed sensor 12 is a speed detector configured to be able to detect a crank angle of the crankshaft 11 to thereby detect an engine speed. An output end portion of the crankshaft 11 is coupled to a propeller shaft 14 via a coupling device 13. The propeller shaft 14 is coupled to a pump shaft 15 of a water jet pump P disposed at a rear portion of the body 2. The propeller shaft 14 and the pump shaft 15 rotate in association with rotation of the crankshaft 11. An impeller 16 is attached on the pump shaft 15. Faring vanes 17 are disposed behind the impeller 16. The impeller 16 is covered with a tubular pump casing 18 at an outer periphery thereof.

A water intake 19 opens on a bottom surface of the hull 3 of the body 2. The water intake 19 is connected to the pump casing 18 through a water passage 20. A pump nozzle 21 is provided on a rear side of the body 2 and is coupled to the pump casing 18. The pump nozzle 21 has a cross-sectional area that is gradually reduced rearward, and an outlet port 22 is provided on a rear end of the pump nozzle 21.

A steering nozzle 23 is coupled to the outlet port 22 of the pump nozzle 21 so as to extend rearward and is configured to be pivotable to the right or to the left.

In the above constructed personal watercraft 1, water outside the watercraft 1 is sucked from the water intake 19 provided on the bottom surface of the hull 3 and is fed to the water jet pump P. Driven by the engine E, the water jet pump P causes the impeller 16 to rotate, pressurizing and accelerating the water. The fairing vanes 17 guide water flow behind the impeller 16. The water is ejected rearward from the outlet port 22 of the pump nozzle 21 and through the steering nozzle 23. As the resulting reaction, the watercraft 1 obtains a propulsion force.

A bar-type steering handle 24 is provided in front of the seat 6. A throttle lever 44 (see FIG. 2), which is a throttle member, is provided at a right grip of the steering handle 24. The steering handle 24 is coupled to the steering nozzle 23 through a steering cable (not shown). When the rider rotates the handle 24 clockwise or counterclockwise, the steering nozzle 23 is pivoted to the right or to the left. That is, by operating the steering handle 24 while the water jet pump P is ejecting water rearward to generate a propulsion force for propelling the body 2, the flow direction of the water ejected through the steering nozzle 23 is changed to the right or to the left. Thereby, the moving direction of the watercraft 1 can be changed.

Figure 2:
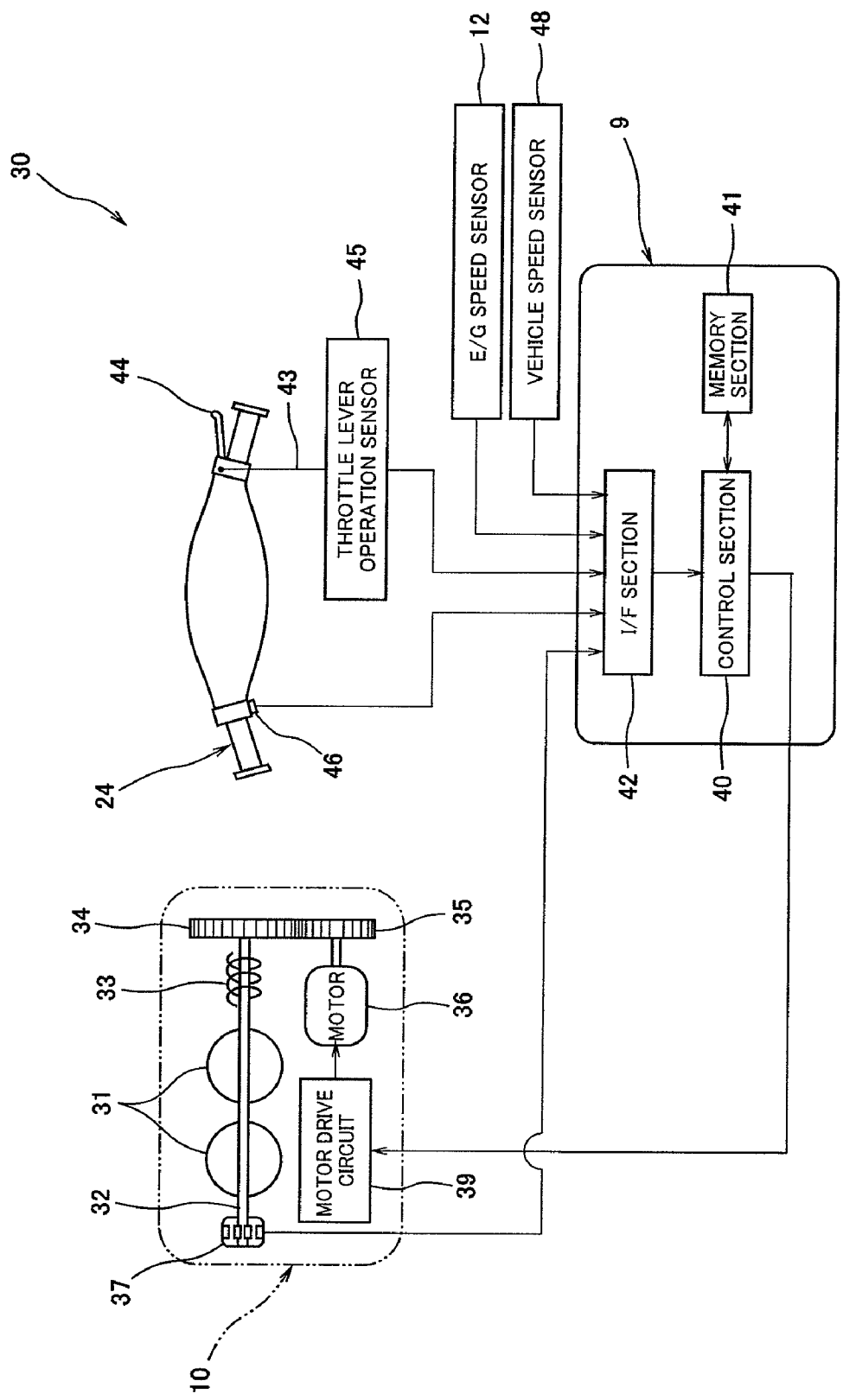
FIG. 2 is a block diagram of a driving control system in the personal watercraft of FIG. 1.

FIG. 2 is a block diagram of a driving control system 30 in the watercraft 1 of FIG. 1. Turning to FIG. 2, the driving control system 30 includes the ECU 9 which is coupled to the electronic control throttle system 30. A throttle handle operation sensor 45 is coupled to the throttle lever 44 attached on the steering handle 24 via a throttle cable 43. The throttle handle operation sensor 45 is a throttle member operation detector configured to detect an amount of the rider's operation of the throttle lever 44. The ECU 9 is configured to operate the electronic control throttle system 10 based on a detection value of the throttle handle operation sensor 45.

To be specific, the electronic control throttle system 10 is configured to open and close a butterfly throttle valve 31 and to open and close an air-intake passage (not shown) connected to the engine E (see FIG. 1), thereby controlling the amount of intake-air to be supplied to the engine E (see FIG. 1). The throttle valve 31 is fixed to a throttle shaft 32 rotatably mounted to the air-intake passage. A first gear 34 is mounted on a right end portion of the throttle shaft 32. The electronic control throttle system 10 includes a motor 36 and a motor drive circuit 39. A second gear 35 is mounted on a drive shaft of the motor 36 and is in mesh with the first gear 34. When the motor 36 rotates, a rotational driving force is transmitted to the throttle shaft 32 via the second gear 35 and the first gear 34, causing the throttle valve 31 to rotate. Thereby, the air-intake passage is opened and closed. A throttle opening degree sensor 37 is attached on a left end portion of the throttle shaft 32 and is configured to be able to detect a rotational angle (opening degree) of the throttle valve 31.

In the above described configuration, the ECU 9 calculates a target opening degree of the throttle valve 31 based on the amount of rider's operation of the throttle lever 44 which is detected by the throttle handle operation sensor 44, and drives the motor 36 so that a difference between the calculated target opening degree and an actual opening degree of the throttle valve 31 which is detected by the throttle opening degree sensor 37 is minimized, thereby correctly controlling the opening degree of the throttle valve 31. A return spring 33 is mounted on the throttle shaft 32. The return spring 33 applies a force in a direction to cause the throttle valve 31 to close the air-intake passage in a state where the rotational driving force is not transmitted from the motor 36 to the throttle shaft 32. Whereas the throttle valves 31 correspond to two cylinders in the structure illustrated in FIG. 2, they may correspond to multiple cylinders, for example, three, four, five, and six cylinders.

The steering handle 24 is provided with an auto-cruise (automated cruise) press button 46 which is an input device which is pressed by the rider to generate a command for starting an auto-cruise mode. The ECU 9 includes an interface (I/F) section 42 which is configured to receive a signal sent externally, a control section 40 (controller) configured to control the motor drive circuit 39 based on the signal received in the interface section 42, and a memory section 41 (memory) which contains information including programs and cruising speed range data to be described later. The throttle handle operation sensor 45, the auto-cruise press button 46, the engine speed sensor 12, a vehicle speed sensor 48, and a throttle opening degree sensor 37 are communicatively coupled to the interface section 42.

The control section 40 of the ECU 9 is configured to control the motor 36 either in a normal mode or an auto-cruise mode. In the normal mode, the control section 40 calculates an optimal target opening degree of the throttle valve 31 based on a detection value of the throttle handle operation sensor 45 and controls the motor 36 so that a deviation between the opening degree detected by the throttle handle operation sensor 45 and the target opening degree is minimized, thus electronically executing manual driving. In the auto-cruise mode, the control section 40 controls the motor 36 to cause the watercraft 1 to drive at a constant engine speed as described later, thus executing a constant speed cruising.

Upon the rider pressing the auto-cruise button 46 in the normal mode, the control section 40 generates the command for starting the auto-cruise mode in response to the rider's operation. On the other hand, upon the rider pressing the auto-cruise button 46 in the auto-cruise mode, the control section 40 generates a command for terminating the auto-cruise mode in response to the rider's operation. Alternatively, the control section 40 may be configured to generate or execute the command for starting the auto-cruise mode only when the rider continues to press the auto-cruise press button 46 for a predetermined time (e.g., 2 seconds), if the engine speed range is outside the cruising speed range (see FIG. 3).

Figure 3:
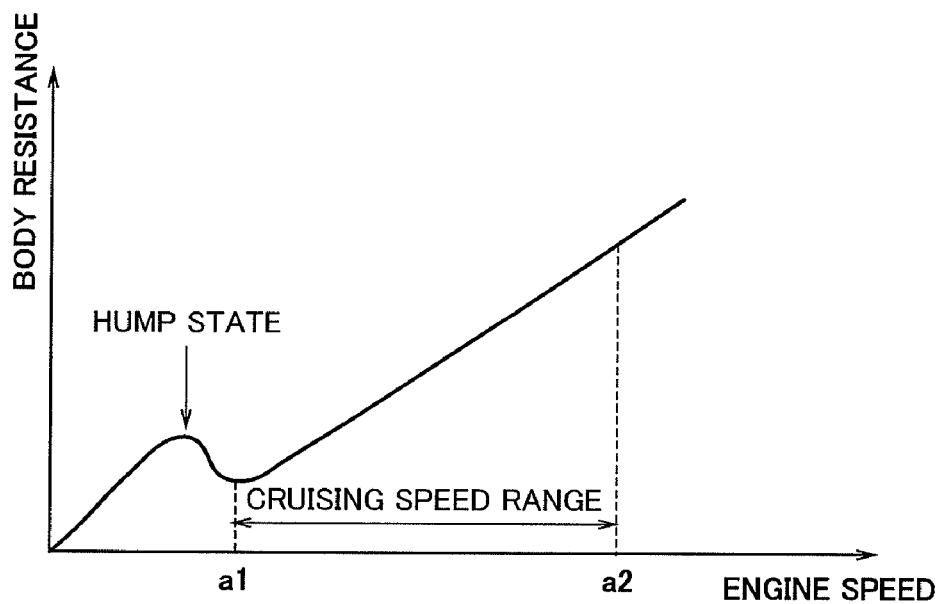
FIG. 3 is a diagram showing a cruising speed range in which the personal watercraft of FIG. 1 is permitted to cruise at a constant speed.

FIG. 3 is a view showing the cruising speed range in which the watercraft 1 in FIG. 1 is permitted to cruise at a constant speed. As shown in FIG. 3, in a hump state where the body 2 (see FIG. 1) moves from a non-planing state to a planing state in a low speed range and thereby floats up from a state of being deeply immersed in water, a body resistance (see FIG. 1) tends to becomes relatively high. In this state, if the watercraft 1 automatically cruises at a constant speed in the low speed range, fuel efficiency becomes lower. For this reason, in the hump state, the watercraft 1 is desirably configured not to cruise in the auto-cruise mode. In addition, the watercraft 1 is desirably configured not to cruise in the auto-cruise mode in a super-high speed range in which the engine speed is excessively high due to the event that, for example, when the watercraft 1 is skipping over the water waves and the water intake 19 is thereby exposed in air for a moment, decreasing the rotational resistance of the engine E.

Therefore, in the cruising speed range which is the engine speed range in which the watercraft 1 is permitted to cruise at a constant speed in the auto-cruise, two critical values, i.e., a lower limit value a1 and an upper limit value a2, are set. The associated cruising speed data are pre-stored in the memory section 41 (see FIG. 2) of the ECU 9. The lower limit value a1 may be, for example, a value of an engine speed at a time point when a body resistance increasing from zero reaches a first minimum value in FIG. 3 or its approximate value. Alternatively, the lower limit value a1 may be a value of an engine speed corresponding to a restricted vehicle speed (approximately 5 mile/h) in shallow water driving which is regulated by U.S. law. The upper limit value a2 may be, for example, a maximum engine speed in a state where the water intake 19 is immersed in water or its approximate value.

Figure 4:
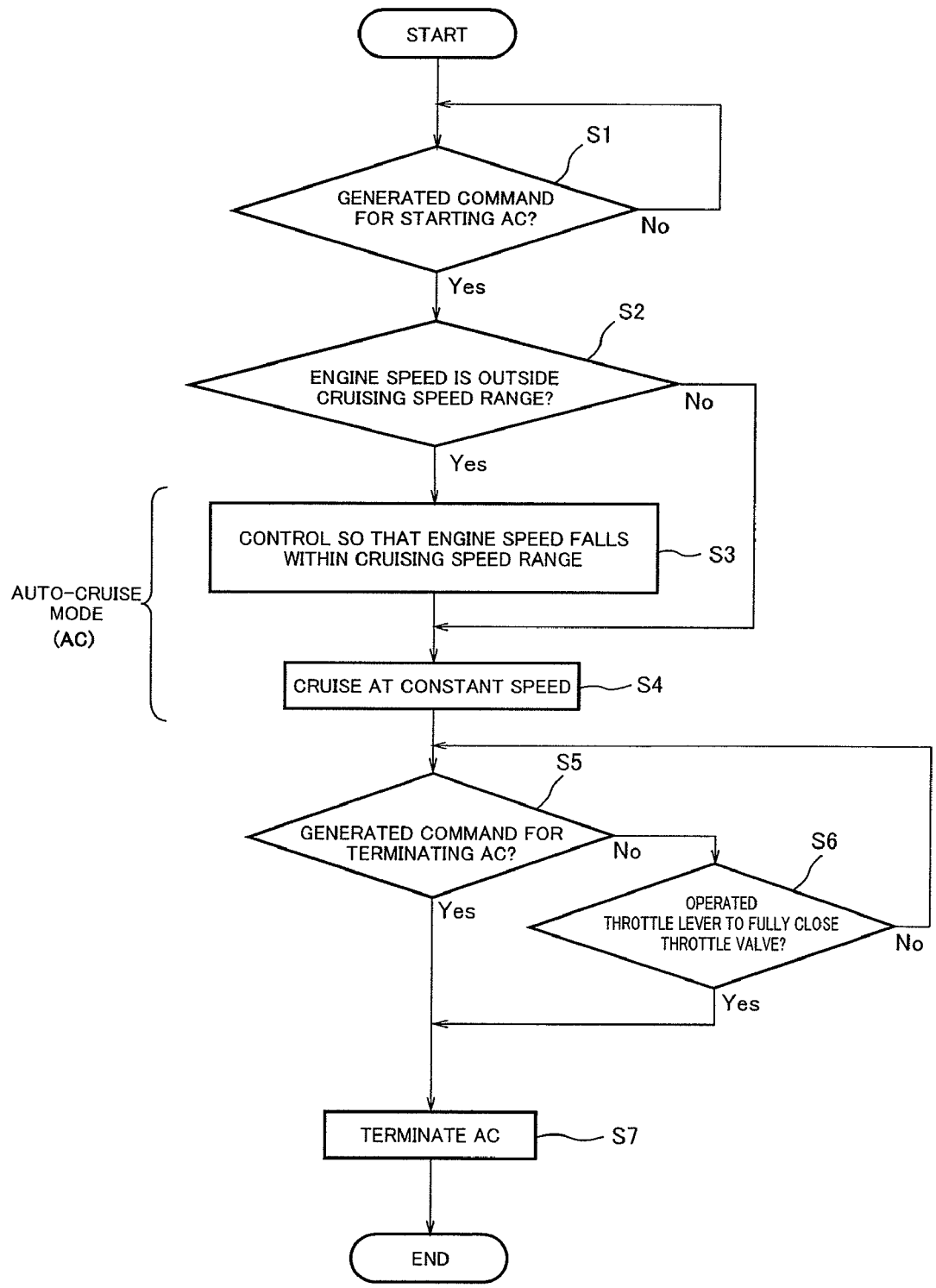
FIG. 4 is a flowchart showing a control process executed by the driving control system of FIG. 2.

FIG. 4 is a flowchart showing a control process executed by the driving control system 30 shown in FIG. 2. In FIG. 4, the auto-cruise mode is expressed as "AC". As shown in FIGS. 2 and 4, the control section 40 of the ECU 9 determines whether or not the command for starting the auto-cruise mode has been generated, due to the event that the rider has pressed the auto-cruise press button 46 in the normal mode (step S1). If it is determined that the command for starting the auto-cruise mode has not been generated in step S1 (NO in step S1), step S1 is repeated. On the other hand, if it is determined that the command for starting the auto-cruise mode has been generated in step S1 (YES in step S1), the control section 40 further determines whether or not the engine speed is outside the cruising speed range (see FIG. 3) (step S2).

If it is determined that the engine speed is not outside the cruising speed range (NO in step S2), the control section 40 maintains the engine speed at the time point when the command for starting the auto-cruise mode has been generated and causes the watercraft 1 to cruise at a constant speed (step S4). To be more specific, the control section 40 executes feedback control so that the engine speed is constant in such a manner that the control section 40 controls the motor 36 with reference to the engine speed which is detected by the engine speed sensor 12.

If it is determined that the engine speed is outside the cruising speed range (see FIG. 3) (YES in step S2), the control section 40 executes control so that the engine speed falls within the cruising speed range in an initial stage of the auto-cruise mode (step S3). To be specific, the control section 40 controls the motor 36 until the engine speed detected by the engine speed sensor 12 reaches the lower limit value a1 or the upper limit value a2 of the cruising speed range, which is closer to the value of the engine speed detected by the engine speed sensor 12, thus controlling the engine speed. To be specific, when the engine speed is lower than the lower limit value a1 (see FIG. 3) in step S2, the control section 40 increases the engine speed to the lower limit value a1. On the other hand, when the engine speed is higher than the upper limit value a2 (see FIG. 3) in step S2, the control section 40 decreases the engine speed to the upper limit value a2.

A speed change rate occurring when the engine speed outside the cruising speed range (FIG. 3) is controlled to fall within the cruising speed range may be set to vary according to a driving state of the watercraft 1 in the state where the command for starting the auto-cruise mode has been generated in step S1. That is, the speed change rate may be set to vary according to at least one of detection values of the engine speed sensor 12, the vehicle speed sensor 48, and the throttle lever operation sensor 45 at the generation of the command for starting the auto-cruise mode.

For example, the absolute value of the speed change rate (acceleration) occurring in the case where the engine speed at the generation of the command for starting the auto-cruise mode is lower than the lower limit value a1 (see FIG. 3) may be set larger than the absolute value of the speed change rate (deceleration) occurring in the case where the engine speed at the generation of the command for starting the auto-cruise mode is higher than the upper limit value a2 (see FIG. 3). In this case, the engine speed may be replaced by the vehicle speed. For example, in the case where the speed change rate is a positive value, the speed change rate may be set smaller when the detection value of the throttle handle operation sensor 45 at the time point of step S1 indicates that the rider has operated the throttle lever 24 to decrease the engine speed than when the detection value of the throttle handle operation sensor 45 at the time point of step S1 indicates that the rider has operated the throttle lever 24 to increase the engine speed.

When the engine speed has reached one of the critical values, i.e., the lower limit value a1 or the upper limit value a2 in the cruising speed range (see FIG. 3), which is closer to the value detected by the engine speed sensor 12, after step S3, the control section 40 maintains the engine speed at approximately lower limit value a1 or the upper limit value a2, and causes the personal watercraft 1 to cruise at a constant speed (step S4). Thereafter, the speed set for the cruising at the constant speed may be adjusted by the operation of the rider. Then, the control section 40 determines whether or not the command for terminating the auto-cruise mode has been generated, due to the event that the rider has pressed the auto-cruise press button 46 in the auto-cruise (step S5).

If it is determined that the command for terminating the auto-cruise mode has been generated (YES in step S5), the control section 40 terminates the auto-cruise mode (step S7). On the other hand, if it is determined that the command for terminating the auto-cruise mode has not been generated (NO in step S5), the control section 40 further determines whether or not the rider has operated the throttle lever 45 to cause the throttle valve 31 to be moved to a fully closed position to thereby decrease the engine speed, based on the detection value of the throttle handle operation sensor 45 (step S6). If it is determined that the rider has operated the throttle lever 45 to cause the throttle valve 31 to move to the fully closed position (YES in step S6), the control section 40 terminates the auto-cruise mode (step S7). On other hand, if it is determined that the rider has not operated the throttle lever 45 to cause the throttle valve 31 to be moved to the fully closed position (NO in step S6), the control section 40 returns the process to step S5.

In accordance with the above described configuration, when the command for starting the auto-cruise mode has been generated, the auto-cruise mode is not inhibited and is started after the engine speed is controlled to fall within the cruising speed range, even if the engine speed is outside the cruising speed range. This makes it possible forto avoid the rider to avoid feeling driving discomfort. Whereas in the present embodiment, the engine speed is controlled in the auto-cruise mode, the vehicle speed may alternatively be controlled in the auto-cruise mode. Also, whereas in the present embodiment, the throttle opening degree is controlled to control the engine speed in step S3 in FIG. 4, ignition timings may alternatively be retarded or put ahead to control the engine speed.

Figure 5:
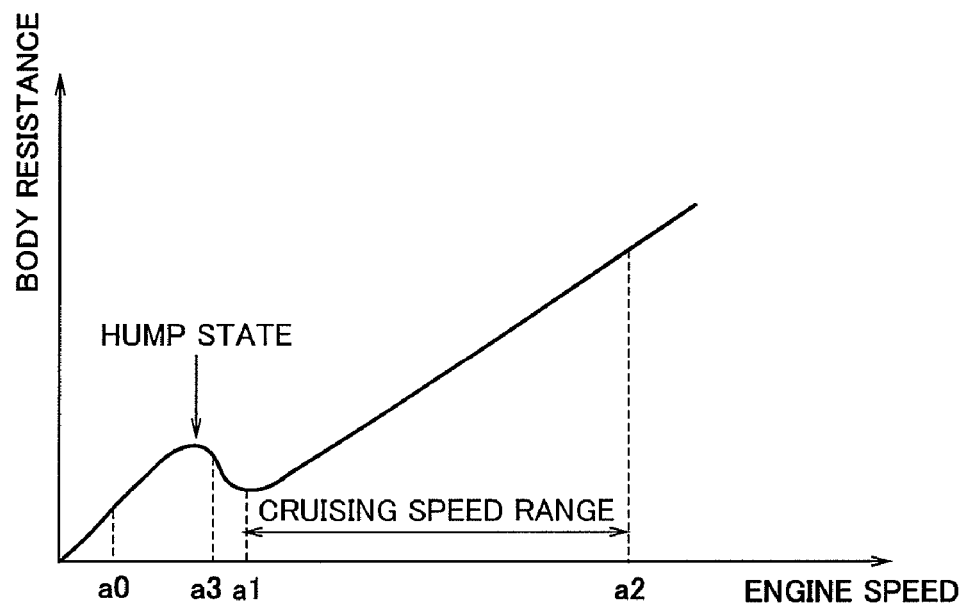
FIG. 5 is a diagram showing a cruising speed range according to an alternative example of the cruising speed range shown in FIG. 3.

FIG. 5 is a diagram showing a cruising speed range according to an alternative example of the cruising speed range shown in FIG. 3. Turning to FIG. 5, a first specified value a0 indicates a regulated vehicle speed (approximately 5 mile/h) during driving in shallow water, which is equal to an engine speed regulated by U.S. law and is smaller than the lower limit value a1 in the cruising speed range, and a second specified value a3 is between the first specified value a0 and the lower limit value a1. In the first alternative example, in step S3 in FIG. 4, the control section 40 (see FIG. 2) may decrease the engine speed to the upper limit value a2 if the engine speed is higher than the upper limit value a2, may decrease the engine speed to the first specified value a0 if the engine speed is between the first specified value a0 and the lower limit value a1, and may increase the engine speed to the first specified value a0 if the engine speed is not higher than the first specified value a0.

In the second alternative example, in step S3 in FIG. 4, the control section 40 (see FIG. 2) may decrease the engine speed to the upper limit value a2 if the engine speed is higher than the upper limit value a2, may increase the engine speed to the lower limit value a1 if the engine speed is between the second specified value a3 and the lower limit value a1, may decrease the engine speed to the first specified value a0 if the engine speed is between the first specified value a0 and the second specified value a3, and may increase the engine speed to the first specified value a0 if the engine speed is not higher than the first specified value a0.

(Embodiment 2)

Figure 6:
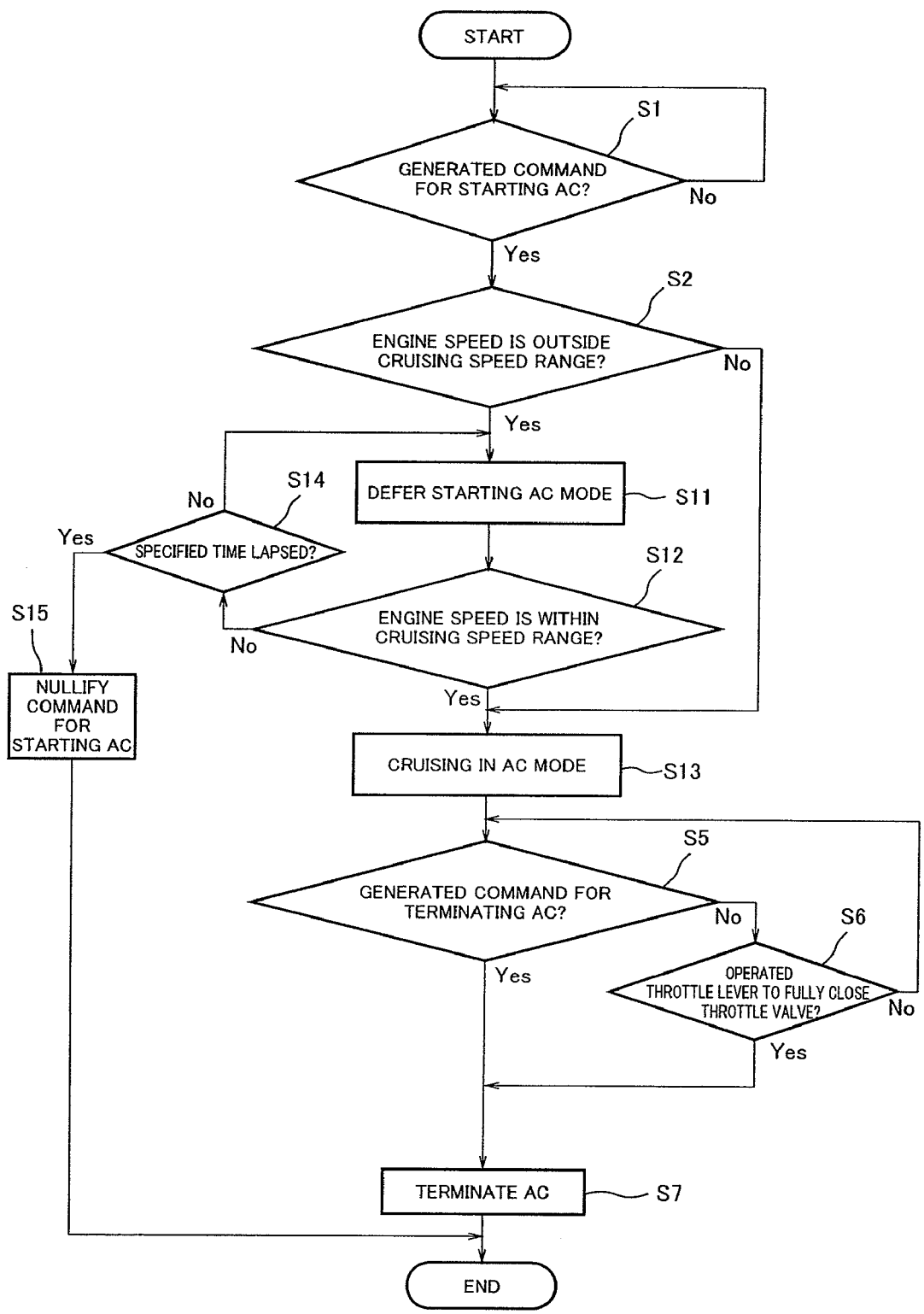
FIG. 6 is a flowchart showing a control process executed by the driving control system of the personal watercraft according to a second embodiment of the present invention.

FIG. 6 is a flowchart showing a control process executed by the driving control system of the personal watercraft according to a second embodiment of the present invention. Turning to FIG. 6, steps S1, S2, S5, S6, and S7 are identical to those of the first embodiment and will not be further described. If it is determined that the engine speed is outside the cruising speed range (see FIG. 3) (YES in step S2), the control section 40 (see FIG. 2) defers starting the auto-cruise mode (step S11). During a defer state, the control section 40 determines whether or not the engine speed falls within the cruising speed range (step S12). If it is determined that the engine speed has reached the lower limit value a1 or the upper limit value a2 which is closer to the value detected by the engine speed sensor 12 (YES in step S12), the control section 40 maintains the engine speed at the upper limit value a1 or the lower limit value a2, or its approximate value, and starts the auto-cruise mode in which the watercraft 1 is cruising at a constant speed (step S13).

On the other hand, if it is determined the engine speed is outside the cruising speed range (see FIG. 3) (NO in step S12), the control section 40 determines whether or not a specified time (e.g., five seconds) has lapsed from when the command for starting the auto-cruise mode has been generated in step S1 (step S14). If it is determined that the specified time has not lapsed (NO in step S14), the control section 40 returns the process to step S11. On the other hand, if it is determined that the specified time has lapsed (YES in step S14), then the control section 40 nullifies the command for starting the auto-cruise mode (step S15).

In accordance with the above described configuration, when the command for starting the auto-cruise mode has been generated, the auto-cruise mode is not inhibited and is started after the control section 40 defers starting the auto-cruise mode until the engine speed falls within the cruising speed range, even if the engine speed is outside the cruising speed range. This makes it possible to avoid for the rider to avoid feeling driving discomfort. If starting of the auto-cruise mode is deferred for a relatively long time, then the command for starting the auto-cruise mode is nullified. This makes it possible to prevent the auto-cruise mode from being started after a lapse of a relatively long time after the rider has operated the auto-cruise press button 46. Therefore, the rider can maintain better driving feeling. The other configuration is identical to that of the first embodiment and will not be further described.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A driving control system for a personal watercraft comprising:
    a speed detector configured to detect a value of an engine speed of an engine mounted in the personal watercraft or a vehicle speed of the watercraft;
    a controller configured to be able to execute an auto-cruise mode in which the watercraft is cruising at a constant engine speed or at a constant vehicle speed;
    a memory configured to store a cruising speed range of the engine speed or the vehicle speed in which the watercraft is permitted to cruise in the auto-cruise mode; and
    an input device which is operated by a rider to cause the controller to generate a command for starting the auto-cruise mode;
    wherein the controller is configured to maintain the engine speed or the vehicle speed at a time point when the command has been generated by the operation of the input device, when the value detected by the speed detector is not outside the cruising speed range; and
    wherein the controller is configured to, in response to the command generated by the operation of the input device, control the engine speed or the vehicle speed so that the value detected by the speed detector falls within the cruising speed range, when the value detected by the speed detector is outside the cruising speed range; and to then cause the watercraft to cruise at the constant engine speed or at the constant vehicle speed;

wherein the controller is configured to, in response to the command generated by the operation of the input device, control the engine speed or the vehicle speed so that the value detected by the speed detector reaches a lower limit value in the cruising speed range when the value detected by the speed detector is smaller than the lower limit value; and to then cause the watercraft to cruise at the constant engine speed or at the constant vehicle speed, which is substantially equal to the lower limit value.

2. The driving control system according to claim 1, wherein the controller is configured to, in response to the command generated by the operation of the input device, control the engine speed or the vehicle speed so that the value detected by the speed detector reaches an upper limit value in the cruising speed range, when the value detected by the speed detector is higher than the upper limit value;

and to then cause the watercraft to cruise at the constant engine speed or at the constant vehicle speed, which is substantially equal to the upper limit value.

3. A driving control system for a personal watercraft comprising:

a speed detector configured to detect a value of an engine speed of an engine mounted in the personal watercraft or a vehicle speed of the watercraft;

a controller configured to execute an auto-cruise mode in which the watercraft is cruising at a constant engine speed or at a constant vehicle speed;

a memory configured to store a cruising speed range of the engine speed or the vehicle speed in which the watercraft is permitted to cruise in the auto-cruise mode; and an input device which is operated by a rider to cause the controller to generate a command for starting the auto-cruise mode;

wherein the controller is configured to maintain the engine speed or the vehicle speed at a time point when the command has been generated by the operation of the input device, when the value detected by the speed detector is not outside the cruising speed range;

wherein the controller is configured to, in response to the command generated by the operation of the input device, control the engine speed or the vehicle speed so that the value detected by the speed detector reaches an upper limit value in the cruising speed range, when the value detected by the speed detector is larger than the upper limit value in the cruising speed range, and to then cause the watercraft to cruise at the constant engine speed or at the constant vehicle speed, which is substantially equal to the upper limit value; and wherein the controller is configured to, in response to the command generated by the operation of the input device, control the engine speed or the vehicle speed so that the value detected by the speed detector reaches a specified value smaller than a lower limit value in the cruising speed range when the value detected by the speed detector is smaller than the lower limit value; and to then cause the watercraft to cruise at the constant engine speed or at the constant vehicle speed, which is substantially equal to the specified value.

4. A driving control system for a personal watercraft comprising:

a speed detector configured to detect a value of an engine speed of an engine mounted in the personal watercraft or a vehicle speed of the watercraft;

a controller configured to execute an auto-cruise mode in which the watercraft is cruising at a constant engine speed or at a constant vehicle speed;

a memory configured to store a cruising speed range of the engine speed or the vehicle speed in which the watercraft is permitted to cruise in the auto-cruise mode; and an input device which is operated by a rider to cause the controller to generate a command for starting the auto-cruise mode;

wherein the controller is configured to maintain the engine speed or the vehicle speed at a time point when the command has been generated by the operation of the input device, when the value detected by the speed detector is not outside the cruising speed range;

wherein the controller is configured to, in response to the command generated by the operation of the input device, control the engine speed or the vehicle speed so that the value detected by the speed detector reaches an upper limit value in the cruising speed range, when the value detected by the speed detector is larger than the upper limit value in the cruising speed range, and to then cause the watercraft to cruise at the constant engine speed or at the constant vehicle speed, which is substantially equal to the upper limit value;

wherein the controller is configured to, in response to the command generated by the operation of the input device, control the engine speed or the vehicle speed so that the value detected by the speed detector reaches a first specified value which is smaller than a lower limit value in the cruising speed range, when the value detected by the speed detector is smaller than the first specified value or when the value detected by the speed detector is larger than the first specified value and is smaller than a second specified value which is between the first specified value and the lower limit value, and to then cause the watercraft to cruise at the constant engine speed or at the constant vehicle speed, which is substantially equal to the first specified value; and wherein the controller is configured to, in response to the command generated by the operation of the input device, control the engine speed or the vehicle speed so that the value detected by the speed detector reaches the lower limit value in the cruising speed range, when the value detected by the speed detector is larger than the second specified value and is smaller than the lower limit value, and to then cause the watercraft to cruise at the constant engine speed or at the constant vehicle speed, which is substantially equal to the lower limit value.

5. The driving control system according to claim 1, wherein the input device includes a press button;

and wherein the controller is configured to generate the command for starting the auto-cruise mode, when the value detected by the speed detector is outside the cruising speed range, and the rider continues to press the press button for a predetermined time.

6. The driving control system according to claim 1, further comprising:

a throttle member which is operated by the rider to change the engine speed or the vehicle speed; and a throttle member operation detector configured to be able to detect an operation of the throttle member;

wherein the controller is configured to terminate the auto-cruise mode, when the throttle member operation detector detects that the rider has operated the throttle member to cause a throttle valve to be moved to a fully closed position so as to decrease the engine speed or the vehicle speed.

7. The driving control system according to claim 1,
wherein a speed change rate occurring in a case where the controller controls the engine speed or the vehicle speed so that the engine speed or the vehicle speed which is outside the cruising speed range falls within the cruising speed range is set to vary according to a driving state of the watercraft at the time point of generation of the command for starting the auto-cruise mode.

8. The driving control system according to claim 7,
wherein the driving state is at least one of the engine speed, the vehicle speed, and an operation state of the throttle member.

9. A driving control system for a personal watercraft comprising:
   a speed detector configured to detect an engine speed of an engine mounted in the personal watercraft or a vehicle speed of the watercraft;
   a controller configured to be able to execute an auto-cruise mode in which the watercraft is cruising at a constant engine speed or at a constant vehicle speed;
   a memory configured to store a cruising speed range of the engine speed or the vehicle speed in which the watercraft is permitted to cruise in the auto-cruise mode; and
   an input device which is operated by a rider to cause the controller to start a command for starting the auto-cruise mode;
   wherein the controller is configured to maintain the engine speed or the vehicle speed at a time point when the command has been generated by the operation of the input device, when a value detected by the speed detector is not outside the cruising speed range;
   wherein the controller is configured to, in response to the command generated by the operation of the input device, defer starting the auto-cruise mode, when the value detected by the speed detector is outside the cruising speed range; and
   to then start the auto-cruise mode and cause the watercraft to cruise at the constant engine speed or at the constant vehicle speed after the value detected by the speed detector falls within the cruising speed range; and
   wherein the controller is configured to, in response to the command generated by the operation of the input device, defer starting the auto-cruise mode when the value detected by the speed detector is smaller than a lower limit value; and to then cause the watercraft to cruise at the constant engine speed or at the constant vehicle speed, which is substantially equal to a lower limit value in the cruising speed range when the value reaches the lower limit value.

10. The driving control system according to claim 9,
wherein the controller is configured to nullify the command for starting the auto-cruise mode, if the value detected by the speed detector does not fall into the cruising speed range after a lapse of a specified time after deferring starting the auto-cruise mode.

11. The driving control system according to claim 9,
wherein the controller is configured to, in response to the command for starting the auto-cruise mode generated by the operation of the input device, defer starting the auto-cruise mode when the value detected by the speed detector is higher than an upper limit value in the cruising speed range; and
   to then cause the watercraft to cruise at the constant engine speed or at the constant vehicle speed, which is substantially equal to the upper limit value, when the value reaches the upper limit value.

12. The driving control system according to claim 9, further comprising:
   a throttle member which is operated by the rider to change the engine speed or the vehicle speed; and
   a throttle member operation detector configured to be able to detect an operation of the throttle member;
   wherein the controller is configured to terminate the auto-cruise mode, when the throttle member operation detector detects that the rider has operated the throttle member to cause a throttle valve to be moved to a fully closed position so as to decrease the engine speed or the vehicle speed.

* * * * *